United States Patent
Asanoi et al.

(10) Patent No.: US 10,228,572 B2
(45) Date of Patent: Mar. 12, 2019

(54) LIGHT CONTROL DEVICE, LIGHT CONTROL WINDOW, AND OPTICAL LAMINATED BODY FOR LIGHT CONTROL DEVICE

(71) Applicant: NITTO DENKO CORPORATION, Ibaraki-shi, Osaka (JP)

(72) Inventors: Yoshiaki Asanoi, Ibaraki (JP); Shoichi Matsuda, Ibaraki (JP); Hiroyuki Takemoto, Ibaraki (JP); Tadayuki Kameyama, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 25 days.

(21) Appl. No.: 15/109,504

(22) PCT Filed: Jan. 7, 2015

(86) PCT No.: PCT/JP2015/050293
§ 371 (c)(1),
(2) Date: Jul. 1, 2016

(87) PCT Pub. No.: WO2015/105130
PCT Pub. Date: Jul. 16, 2015

(65) Prior Publication Data
US 2016/0334633 A1    Nov. 17, 2016

(30) Foreign Application Priority Data
Jan. 10, 2014 (JP) ................................. 2014-003743

(51) Int. Cl.
*G02B 27/28* (2006.01)
*E06B 9/24* (2006.01)
*G02B 5/30* (2006.01)

(52) U.S. Cl.
CPC .............. *G02B 27/281* (2013.01); *E06B 9/24* (2013.01); *G02B 5/3016* (2013.01); *G02B 5/3083* (2013.01); *E06B 2009/2405* (2013.01)

(58) Field of Classification Search
CPC .... G02B 26/02; G02B 26/023; G02B 3/3062; G02B 27/283; G02B 27/281; G02B 27/28;
(Continued)

(56) References Cited

FOREIGN PATENT DOCUMENTS

| JP | 4-293889 A | 10/1992 |
|---|---|---|
| JP | 9-310567 A | 12/1997 |

(Continued)

OTHER PUBLICATIONS

International Search Report dated Mar. 24, 2015, issued in counterpart international application No. PCT/JP2015/050293(2pages).
(Continued)

*Primary Examiner* — Jie Lei
(74) *Attorney, Agent, or Firm* — Westerman, Hattori, Daniels & Adrian, LLP

(57) ABSTRACT

A light control device of the present invention includes a first patterning polarizing plate 21 containing a plurality of polarization regions having different absorption axis directions, a second patterning polarizing plate 22 containing the same polarization regions as those of the first patterning polarizing plate 21, and a retardation plate 3, wherein at least any one of the first and the second patterning polarizing plates 21, 22 is disposed slidably in a plane direction. Such a light control device hardly causes color irregularities and hardly causes a pattern.

8 Claims, 11 Drawing Sheets

(58) Field of Classification Search
CPC ...... G02B 27/286; G02B 5/30; G02B 5/3083; G02B 5/3016; G02B 5/3033; G02F 1/13473; G02F 1/1334; G02F 1/133509; G02F 1/133784; A61F 2/1618; G01J 3/14; C23C 16/56; E06B 9/24; E06B 2009/2405
USPC ............ 359/489.07, 486.01, 486.02, 489.01, 359/489.06, 489.15, 489.18, 490.03; 349/16, 18, 104, 126; 427/532, 553, 554, 427/558
See application file for complete search history.

(56) References Cited

FOREIGN PATENT DOCUMENTS

| | | |
|---|---|---|
| JP | 2010-244681 A | 10/2010 |
| JP | 2011-90042 A | 5/2011 |
| JP | 2013-231761 A | 11/2013 |

OTHER PUBLICATIONS

Office Action dated Nov. 21, 2017, issued in counterpart Japanese Application No. 2014-003743, with partial English translation (7 pages).

LIGHT CONTROL DEVICE, LIGHT CONTROL WINDOW, AND OPTICAL LAMINATED BODY FOR LIGHT CONTROL DEVICE

TECHNICAL FIELD

The present invention relates to a light control device capable of adjusting a transmission quantity of light.

BACKGROUND ART

Hitherto, there has been known a patterning polarizing plate containing a plurality of polarization regions having different absorption axis directions, and there has been known that a light control device can be configured with use of two of the polarizing plate (e.g., Patent Document 1).

Specifically, the patterning polarizing plate contains a first polarization region having an absorption axis in a certain direction, and a second polarization region having an absorption axis in a direction orthogonal to the absorption axis direction of the first polarization region, and the first polarization region and the second polarization region are alternately arranged in a plane. Further, by disposing two of the above polarizing plates in parallel so as to face each other, a light control device can be formed.

In the light control device, two polarizing plates can be slid in a plane direction. Therefore, when the first polarization regions of two polarizing plates are overlaid on each other or the second polarization regions are overlaid on each other, or when the first polarization region of one polarizing plate is overlaid on the second polarization region of the other polarizing plate, brightness of light exiting the light control device can be adjusted.

That is, in a state in which the first polarization region and the second polarization region overlap (light blocking state), an absorption axis direction of the first polarization region is orthogonal to an absorption axis direction of the second polarization region. Therefore, theoretically, all of incident light from a side opposite to the viewing side of the light control device is blocked by the light control device, and the light does not reach the viewing side of the light control device. The incident light from the side opposite to the viewing side of the light control device is converted to specific linearly polarized light by a polarizing plate positioned on the side opposite to the viewing side (specific linearly polarized light is extracted from incident light). The linearly polarized light does not transmit through a polarizing plate positioned on the viewing side. Accordingly, light does not reach the viewing side of the light control device.

On the other hand, in a state in which the first polarization regions and the second polarization regions of two polarizing plates overlap (light-transmitting state), the absorption axis directions are parallel to each other. In this case, the incident light from the side opposite to the viewing side of the light control device is converted to specific linearly polarized light by a polarizing plate positioned on the side opposite to the viewing side, and the linearly polarized light transmits through a polarizing plate positioned on the viewing side. Accordingly, light reaches the viewing side of the light control device.

When the light control device is incorporated in a light-transmitting plate (e.g., window glass) requiring light control, a light control window can be formed. Since the light control window includes a light control device, it is possible to switch between a light-transmitting state and a light blocking state. Therefore, it is possible to moderately adjust a quantity of light entering the viewing side (e.g., indoor) of the light control window.

As described above, in the light-transmitting state, since specific linearly polarized light transmits through the light control device or the light control window, light reaches the viewing side of the light control device or the light control window. However, when the light control device or the light control window in the light-transmitting state is observed at the viewing side, color irregularities (difference in contrasting density) may be occurred between the first polarization region and the second polarization region. The color irregularities are occurred in response to a region configuration of the first and the second polarization regions. Therefore, for example, when the first and the second polarization regions are alternately disposed in the shape of a belt, a stripe-like pattern may appear. Occurrence of such color irregularities and a pattern resulting from the color irregularities has a problem of uglifying the light control device and the light control window. Particularly, the color irregularities are remarkable in observing the light control device or the light control window in an oblique direction on the viewing side.

[Patent Document 1] JP H09-310567 A

SUMMARY OF THE INVENTION

It is an object of the present invention to provide a light control device which hardly causes color irregularities, and a light control window, and to provide an optical laminated body which is suitable for the light control device.

The present inventors have made earnest investigations concerning causes of color irregularities, and consequently found that one contributing factor of color irregularities is a difference in a transmittance between a plurality of polarization regions, and the color irregularities are hardly occurred by reducing the difference in a transmittance.

A light control device of the present invention includes a first patterning polarizing plate containing a plurality of polarization regions having different absorption axis directions, a second patterning polarizing plate containing the same polarization regions as those of the first patterning polarizing plate, and a retardation plate, wherein at least any one of the first and the second patterning polarizing plates is disposed slidably in a plane direction.

In a preferable light control device of the present invention, each of the first patterning polarizing plate and the second patterning polarizing plate contains at least a first polarization region and a second polarization region, and an absorption axis direction of the first polarization region is orthogonal to an absorption axis direction of the second polarization region.

Preferably, the retardation plate is disposed on the outside of the first and the second patterning polarizing plates.

Further, preferably, the retardation plate is a quarter-wave plate or a three quarter-wave plate, and its in-plane retardation value (Re[590]) is 100 nm or more. Preferably, an in-plane retardation value (Re[590]) of the retardation plate is 4000 nm or more.

In a preferable light control device of the present invention, a slow axis direction of the retardation plate is non-parallel to all absorption axis directions of a plurality of polarization regions contained in the first and the second patterning polarizing plates. Preferably, an angle between the slow axis direction of the retardation plate and each of the absorption axis directions of the plurality of polarization regions is in the range of 10° to 80°.

In another aspect of the present invention, a light control window is provided. The light control window of the present invention includes the light control device and a light-transmitting plate serving as an objective of light control by the light control device.

In a preferable light control window of the present invention, the light-transmitting plate has an optically isotropic property. Preferably, the light-transmitting plate is a window glass. Preferably, the light-transmitting plate is disposed on the outside of the light control device.

In another aspect of the present invention, an optical laminated body for a light control device is provided. The optical laminated body for the light control device of the present invention includes a patterning polarizing plate containing a plurality of polarization regions having different absorption axis directions and a retardation plate.

Since the light control device of the present invention has a retardation plate, the difference in a transmittance between a plurality of polarization regions is reduced, and consequently it is possible to effectively prevent the color irregularities from being occurred on a viewing side of the light control device.

Further, the light control device can be easily formed by using the optical laminated body for a light control device of the present invention.

DESCRIPTION OF THE PREFERRED EMBODIMENTS

Hereinafter, the present invention will be specifically described.

In this specification, the terms "first" and "second" may be added as prefixes. These prefixes, however, are only added in order to distinguish the terms and do not have specific meaning such as order and relative merits. In addition, the angles and their relations (e.g., orthogonal, parallel, 45°, etc.) include error ranges allowable in the technical field to which the present invention pertains. For example, "parallel" or the like means an angle within a range of the precise angle ±5°, preferably ±3°.

In this specification, the expression of "PPP to QQQ" means "PPP or more and QQQ or less".

[Summary of Light Control Device]

Figure 1:
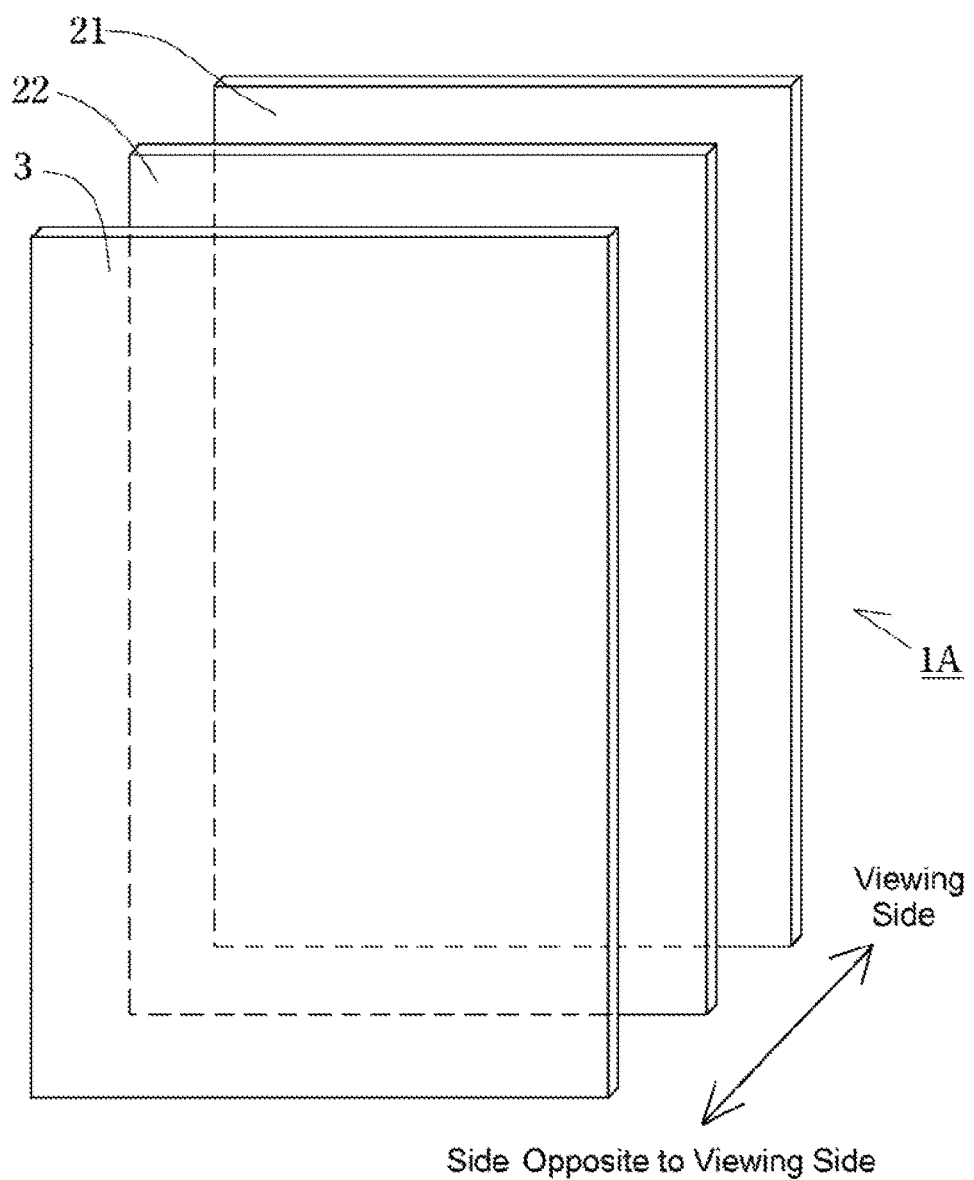
FIG. 1 is a perspective view schematically illustrating a light control device according to an embodiment.

As illustrated in FIG. 1, a light control device 1A of the present invention has a first patterning polarizing plate 21, a second patterning polarizing plate 22, and a retardation plate 3. The first patterning polarizing plate 21 contains a plurality of polarization regions having different absorption axis directions in its plane, and the second patterning polarizing plate 22 contains the same polarization regions as those of the first patterning polarizing plate 21. When at least any one of the first patterning polarizing plate 21 and the second patterning polarizing plate 22 is slid in a plane direction, it is possible to switch between a light-transmitting state and a light blocking state of the light control device 1A. In addition, please be mindful of the fact that in the perspective view of FIG. 1 schematically illustrating a light control device, members such as a patterning polarizing plate and a retardation plate are described away from each other, but in actual, the members are laminated (hereinafter, much the same is true on the perspective views of FIG. 5 to FIG. 8 similarly schematically illustrating a light control device).

A position relation among the first and the second patterning polarizing plates 21 and 22 and the retardation plate 3 is not particularly limited, and the position relation can be appropriately changed according to a position of a light source which emits light serving as an objective of light transmitting and light blocking. Though, the retardation plate 3 is preferably arranged on the outside of the first and the second patterning polarizing plates 21 and 22. That is, it is preferred that the retardation plate 3 is not arranged between the first patterning polarizing plate 21 and the second patterning polarizing plate 22 (insides of the first and the second patterning polarizing plates 21 and 22).

In an embodiment illustrated in FIG. 1, the first patterning polarizing plate 21, the second patterning polarizing plate 22, and the retardation plate 3 are arranged in this order from a first outside (viewing side) toward a second outside (side opposite to the viewing side) of the light control device 1A.

In addition, the side opposite to the viewing side is a side in which a light source emitting light serving as an objective of light transmitting and light blocking of the light control device is present, and the viewing side is a side opposite to the side opposite to the viewing side of the light control device 1A.

When the light control device 1A is viewed from both sides of the first and the second patterning polarizing plates 21 and 22 (e.g., a light source is arranged on both sides of the light control device 1A), the retardation plate 3 may be disposed on both of the first patterning polarizing plate side (i.e., the first outside) and the second patterning polarizing plate side (i.e., the second outside) which are outsides of both patterning polarizing plates 21 and 22 (not illustrated). In this case, at least two retardation plates are used. The two retardation plates may be the same or different.

The light control device 1A of the present invention may further have other layers. Though, it is preferred that between the first patterning polarizing plate 21 and the second patterning polarizing plate 22, another layer is not interposed, or only a layer having an optically isotropic property (layer not having an optically anisotropic property) is interposed. If another layer having an optically anisotropic property is interposed between the first patterning polarizing plate 21 and the second patterning polarizing plate 22, a directional property of linearly polarized light transmitting through the second patterning polarizing plate 22 is disturbed by this another layer, and therefore it may become hard to switch between the light-transmitting state and the light blocking state of the light control device 1A by the first patterning polarizing plate 21.

For example, on a side opposite to the viewing side of the retardation plate 3, a known protection layer or an antireflection layer may be disposed, and another retardation plate may be further disposed on the viewing side of the first patterning polarizing plate 21.

The light control device of the present invention can be used by itself or it can also form a light control window by being applied to a light-transmitting plate serving as an objective of light control. A specific constitution of the light control window will be described later.

Hereinafter, members of the light control device of the present invention will be described.

[Patterning Polarizing Plate]

The patterning polarizing plate is a member containing, in its plane, a plurality of polarization regions having different absorption axis directions. The plurality of polarization regions may be disposed regularly in a plane of the patterning polarizing plate or may be disposed irregularly; however, the plurality of polarization regions is preferably disposed regularly. Further, the plurality of polarization regions is preferably disposed side by side in one direction.

The polarization region is a region having the optical characteristic of converting natural light or various kinds of polarized light into linearly polarized light. That is, the polarization region is a region having the optical characteristic of transmitting specific linearly polarized light when natural light or various kinds of polarized light is applied thereto.

The single transmittance of each of the plurality of polarization regions is not particularly limited, and for example, it is within the range of 10% to 90%.

The patterning polarizing plate is not particularly limited conditionally on containing a plurality of polarization regions, and the patterning polarizing plate may have a single layer structure or a multilayer structure having two or more layers.

Figure 3:
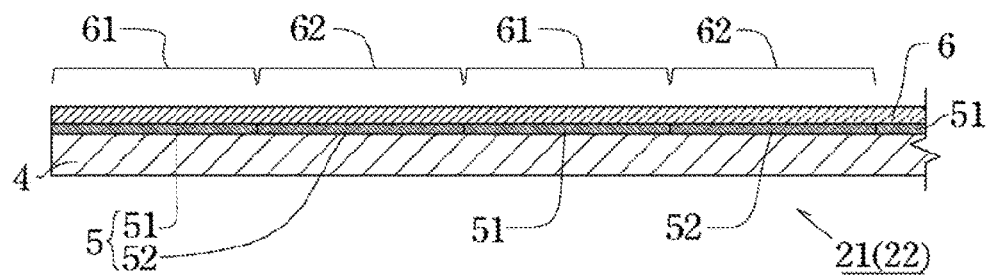
FIG. 3 is an enlarged sectional view taken along a line III-III in FIG. 2.

For example, as illustrated in FIG. 3, a patterning polarizing plate 21 (22) includes a substrate 4, an alignment layer 5 laminated on the surface of the substrate 4, and a patterning polarizing layer 6 laminated on the surface of the alignment layer 5.

The substrate is formed in a rectangular shape in plan view, for example. However, the shape of the substrate is not limited thereto, and may be formed in any shape, such as a long shape (a rectangular shape extremely long in the longitudinal direction). The thickness of the substrate is not particularly limited, but it is 20 μm to 200 μm, and preferably 30 μm to 100 μm, for example.

Figure 2:
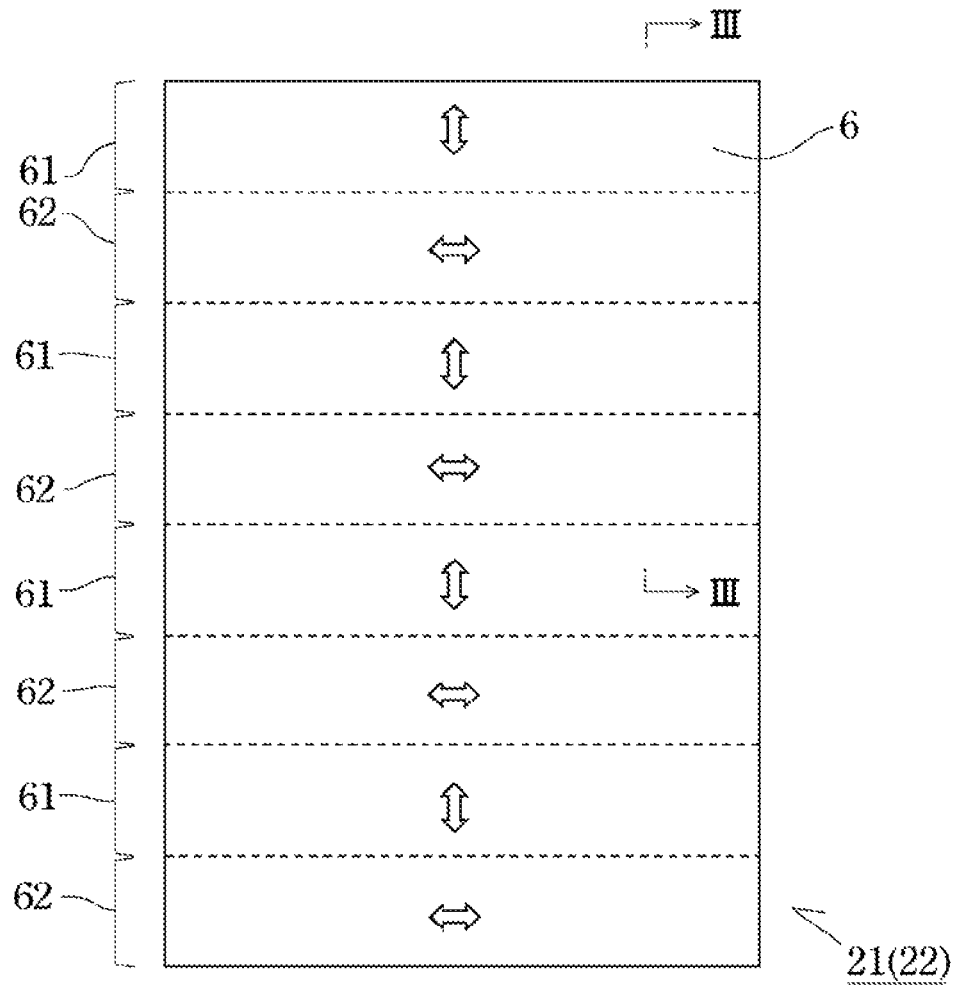
FIG. 2 is a plan view schematically illustrating a patterning polarizing plate according to one embodiment.

As illustrated in FIG. 2 and FIG. 3, the patterning polarizing layer 6 contains at least two polarization regions having different absorption axis directions. Hereinafter, these polarization regions will be referred to as a first polarization region 61 and a second polarization region 62.

The thickness of the first polarization region 61 and the thickness of the second polarization region 62 may be different from each other, but are preferably the same as illustrated in FIG. 3. The thickness of the first polarization region 61 and that of the second polarization region 62 are, for example, each independently 0.01 μm to 10 μm, preferably 0.1 μm to 5 μm, and particularly preferably 0.1 μm to 1 μm.

The first polarization region 61 and the second polarization region 62 each have an absorption axis in its plane. In FIG. 2, the first polarization region 61 and the second polarization region 62 are alternately arranged in a longitudinal direction of the substrate 4. The first polarization region 61 and the second polarization region 62 each have a strip-like shape in plan view, extending in a short direction of the substrate 4. The short direction of the substrate 4 is a direction orthogonal to the longitudinal direction of the substrate 4 in the plane of the substrate 4.

Figure 4:
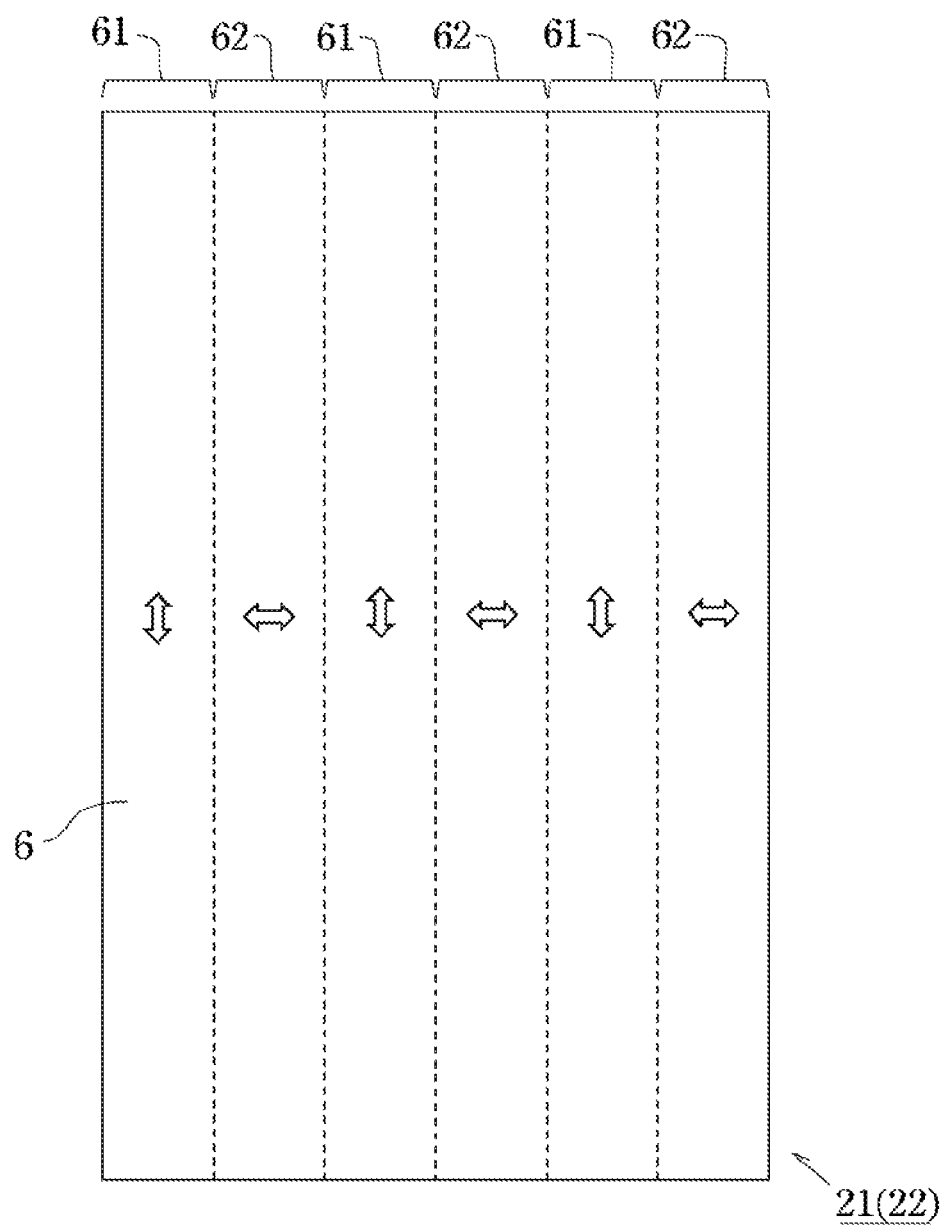
FIG. 4 is a plan view schematically illustrating a patterning polarizing plate according to another embodiment.

However, the patterning polarizing plate of the present invention is not limited to the embodiment illustrated in FIG. 2 and may be in the form of FIG. 4 as illustrated. In FIG. 4, the first polarization region 61 and the second polarization region 62 are alternately arranged in the short direction of the substrate 4. The first polarization region 61 and the second polarization region 62 both have a strip-like shape in plan view extending in the longitudinal direction of the substrate.

The absorption axis direction of the first polarization region 61 and the absorption axis direction of the second polarization region 62 are different from each other as a prerequisite, and their directions are not particularly limited. Preferably, the absorption axis direction of the first polarization region 61 is orthogonal to the absorption axis direction of the second polarization region 62. In FIG. 2 and FIG. 4, the absorption axis direction of the first polarization region 61 is parallel to the longitudinal direction of the substrate 4, and the absorption axis direction of the first polarization region 62 is orthogonal to the longitudinal direction of the substrate 4 (That is, it is parallel to the short direction).

Incidentally, a void arrow in each plan view indicates the direction of the absorption axis of each polarization region (same hereinafter). In addition, the transmission axis of each polarization region occurs in the direction orthogonal to the absorption axis in the plane of the polarization region.

The first polarization region 61 and the second polarization region 62 may be made of the same material, or may also be made of different materials from each other. Preferably, the first polarization region and the second polarization region are made of the same material to lower the difference in transmittance of the first polarization region and the second polarization region. In addition, the first polarization region 61 and the second polarization region 62 may be each composed of a laminate of two or more layers.

In FIG. 3, the first polarization region 61 and the second polarization region 62 are each composed of a single layer made of the same material. The first polarization region 61 and the second polarization region 62 made of the same material are formed of one continuous layer, excluding that the directions of their absorption axes are different from each other. The one continuous layer means that no structural interface is observed at the boundary between the plurality of polarization regions 61 and 62 as illustrated in FIG. 3. When the plurality of polarization regions 61 and 62 are formed of one continuous layer, no stress occurs at the boundary between the polarization regions. Thus, the dimensional stability of the polarization regions 61 and 62 is improved.

A width of the first polarization region 61 is the same as that of the second polarization region 62. Preferably, the first polarization region 61 and the second polarization region 62 have the same shape and the same size in a plan view. Specific dimensions of the widths of the respective polarization regions 61 and 62 can be appropriately set, and they are several millimeters to 10 centimeters.

The widths of the first polarization region 61 and the second polarization region 62 are lengths in a vertical direction of these regions in FIG. 2, and are lengths in a short direction in FIG. 4.

In the illustrated example where the first polarization region 61 and the second polarization region 62 are provided, two kinds of alignment layers 5 are provided. One alignment layer 51 (first alignment layer 51) corresponds to the first polarization region 61. The alignment layer 51 is interposed between the substrate 4 and the first polarization region 61, and the other alignment layer 52 (second alignment layer 52) corresponds to the second polarization region 62. The alignment layer 52 is interposed between the substrate 4 and the second polarization region 62.

The first alignment layer 51 has the function of aligning the formation material of the polarization region in a predetermined direction to form a first polarization region 61 having such an absorption axis direction, while the second alignment layer 52 has the function of aligning the formation material of the polarization region in a predetermined direction to form a second polarization region 62 having such an absorption axis direction.

The first alignment layer 51 and the second alignment layer 52 may be made of the same material, or may also be made of different materials from each other. In addition, the first alignment layer 51 and the second alignment layer 52 may have different thicknesses from each other or the same thickness. Preferably, the first alignment layer 51 and the second alignment layer 52 have the same thickness. The thickness of the first alignment layer 51 and that of the second alignment layer 52 are each independently 0.1 µm to 10 µm, for example. In addition, the width of the first alignment layer 51 and the width of the second alignment 52 are the same.

Hereinafter, each part of the patterning polarizing plate is described in detail.

(Substrate and Alignment Layer)

The substrate is not particularly limited as long as it can support the patterning polarizing layer. Examples of the substrate include polymer films having flexibility and metal thin-plate having flexibility. Further, a surface of the substrate may be subjected to hydrophilization treatment such as corona treatment.

As the substrate, a polymer film is preferably used, and the polymer film excellent in transparency (for example, having a haze value of 3% or less) is preferably used.

As a material for the polymer film, polyester type such as polyethylene terephthalate; cellulose type such as triacetylcellulose; polycarbonate type; acryl type such as polymethyl methacrylate; styrene type such as polystyrene; olefin type such as polypropylene, and polyolefin having a ring-shaped or a norbornen structure; and the like can be cited. A norbornen type film is preferably used so that the dichroic liquid crystal compounds are favorably aligned.

The thickness of the substrate is not particularly limited, and for example, it is 20 µm to 100 µm when the polymer film is used.

Further, a surface of the substrate is preferably subjected to alignment treatment. When the substrate surface undergoes the alignment treatment, since alignment regulating force is imparted to the surface of the substrate, a patterning polarizing layer can be favorably formed on the substrate. Examples of a method of imparting alignment regulating force include (1) rubbing the surface of a substrate; (2) forming a film of polyimide or the like on the surface of a substrate and rubbing the film surface to form an alignment layer on the surface of a substrate; (3) forming a film made of a photoactive compound on the surface of a substrate and irradiating the film with light to form an alignment layer on the surface of a substrate; and (4) applying a magnetic field or the like to the surface of a substrate.

In the embodiment illustrated in FIG. 3, the alignment regulating force is imparted to the substrate by forming the alignment layer on the substrate (method of the above (2) or (3)).

The alignment direction in the alignment treatment is not particularly limited, and is suitably set considering the directions in which the absorption axes of the polarization regions of the patterning polarizing layer are to be developed.

For example, by forming on each of the surface of the substrate, a first alignment layer aligned in an arbitrary direction and a second alignment layer aligned in the direction orthogonal thereto are each formed on the surface of the substrate, as illustrated in FIG. 2 to FIG. 4, a patterning polarizing layer containing two polarization regions whose absorption axes occur in directions orthogonal to each other can be formed on the substrate.

For the formation of an alignment layer, conventionally known methods can be employed without particular limitation. For example, the formation of a photoalignment layer is preferable. Materials and methods for forming the alignment layer are disclosed in detail in JP 2007-133184 A, JP 2000-226448 A, and the like. The materials and methods for forming the alignment layer of these gazettes are incorporated as if set forth herein, and their descriptions are omitted. However, as necessary, the descriptions about the alignment layer from these publications can be fully incorporated herein.

(Patterning Polarizing Layer)

A method of forming the patterning polarizing layer is not particularly limited as long as it can form the polarization region. The polarization region can also be formed, for example, by bonding an existing polarizing film (e.g., a film obtained by adsorbing a dichroic dye such as iodine on a PVA film and stretching the resulting film) to the substrate, or by applying a material for forming a polarizing layer onto a substrate so as to be aligned and drying the material.

Examples of the formation material of the patterning polarizing layer of the present invention include an azo based compound, an anthraquinone based compound, a perylene based compound, an indanthrone based compound, an imidazole based compound, an indigoid based compound, an oxazine based compound, a phthalocyanine based compound, a triphenylmethane based compound, a pyrazolone based compound, a stilbene based compound, a diphenylmethane based compound, a naphthoquinone based compound, a merocyanine based compound, a quinophthalone based compound, a xanthene based compound, an alizarin based compound, an acridine based compound, a quinonimine based compound, a thiazole based compound, a methine based compound, a nitro based compound, and a nitroso based compound may be cited. These compounds may be used alone or in combination of two or more kinds.

As a formation material of the patterning polarizing layer, preferably a dichroic liquid crystal compound is used, and more preferably a dichroic liquid crystal compound having lyotropic liquid crystallinity is used. Use of a dichroic liquid crystal compound allows a plurality of polarization regions having an absorption axis in a predetermined direction to be formed easily by only coating a coating solution containing a dichroic liquid crystal compound on a substrate subjected to an alignment treatment. The dichroic liquid crystal compound is preferably a compound showing an absorption at least in a visible light region (wavelength of 380 nm to 780 nm).

The lyotropic liquid crystallinity is a property of undergoing a phase transition of isotropic phase-liquid crystal phase by changing the temperature and concentration of a solution in a state of being dissolved in a solvent.

The isotropic phase is a phase in which macroscopic optical properties do not vary depending on a direction (optical anisotropy is not illustrated).

A compound having the lyotropic liquid crystallinity has a property of showing a liquid crystal phase and forming a supermolecule in a solution state. The structure of the supermolecule is not particularly limited, and examples thereof include micellar structures such as a spherical structure, a columnar structure and a tubular structure; and lamellar structures. The liquid crystal phase can be confirmed and identified by an optical pattern observed with a polarizing microscope.

For example, a disazo compound represented by the following general formula (1) is used as a formation material of the patterning polarizing layer of the present invention. This disazo compound has lyotropic liquid crystallinity and is a dichroic liquid crystal compound showing an absorption in a visible light region.

(1)

In the general formula (1), $Q^1$ and $Q^3$ each represent a substituted or unsubstituted aryl group, and $Q^2$ represents a substituted or unsubstituted arylene group.

The substituted or unsubstituted aryl group includes an aryl group with non-adjacent carbon atoms partially substituted with nitrogen atoms. Similarly, the substituted or unsubstituted arylene group includes an arylene group with non-adjacent carbon atoms partially substituted with nitrogen atoms.

Herein, in this specification, "substituted or unsubstituted" means "having a substituent or having no substituent".

Examples of the aryl group represented by $Q^1$ and $Q^3$ include a condensed ring group where two or more benzene rings are condensed, such as a naphthyl group in addition to a phenyl group. When the aryl group represented by $Q^1$ and $Q^3$ has a substituent, the substituent is each independently represent, for example, an alkyl group having 1 to 4 carbon atoms, an alkoxy group having 1 to 4 carbon atoms, a thioalkyl group having 1 to 4 carbon atoms, a hydroxy alkyl group having 1 to 4 carbon atoms such as a dihydroxy propyl group, an alkyl amino group having 1 to 4 carbon atoms, a phenyl amino group having 6 to 20 carbon atoms, an acyl amino group having 1 to 4 carbon atoms, a halogeno group, a nitro group, a cyano group, an acetamide group, a phosphoric acid group, —OH group, —$SO_3M$ group, —COOM group, —NHR group, and —CONHR group. M represents a counter ion. R of —NHR group includes a hydrogen atom, a substituted or unsubstituted alkyl group having 1 to 3 carbon atoms, a substituted or unsubstituted acetyl group, a substituted or unsubstituted benzoyl group, or a substituted or unsubstituted phenyl group.

When the aryl group represented by $Q^1$ and $Q^3$ each has a substituent, the number of substituent may be one or two or more.

$Q^1$ is preferably a substituted or unsubstituted phenyl group (including a phenyl group with non-adjacent carbon atoms partially substituted with nitrogen atoms), or a substituted or unsubstituted naphthyl group (including a naphthyl group with non-adjacent carbon atoms partially substituted with nitrogen atoms), more preferably a substituted or unsubstituted phenyl group, and particularly preferably a phenyl group having a substituent.

$Q^3$ is preferably a substituted or unsubstituted naphthyl group (including a naphthyl group with non-adjacent carbon atoms partially substituted with nitrogen atoms), more preferably a naphthyl group having a substituent, and particularly preferably a naphthyl group having a polar group as a substituent. Examples of the polar group include a hydroxyalkyl group having 1 to 4 carbon atoms, an alkylamino group having 1 to 4 carbon atoms, an acylamino group having 1 to 4 carbon atoms, a nitro group, an acetamide group, a phosphoric acid group, —OH group, —$SO_3M$ group, —COOM group, —NHR group, and —CONHR group. The polar group is preferably —OH group, —$SO_3M$ group, and —NHR group.

Examples of the arylene group represented by $Q^2$ include a condensed ring group where two or more benzene rings are condensed, such as a naphthylene group in addition to a phenylene group. When the arylene group represented by $Q^2$ has a substituent, the groups mentioned above can be cited as a substituent.

When the aryl group represented by $Q^2$ has a substituent, the number of substituent may be one or two or more.

$Q^2$ is preferably a substituted or unsubstituted naphthylene group (including a naphthylene group with non-adjacent carbon atoms partially substituted with nitrogen atoms), more preferably a naphthylene group having a polar group, and particularly preferably a naphthylene group having —$SO_3M$ group.

Among disazo compounds represented by the above general formula (1), a preferable disazo compound is represented by the following general formula (2), and a more preferable disazo compound is represented by the general formula (3).

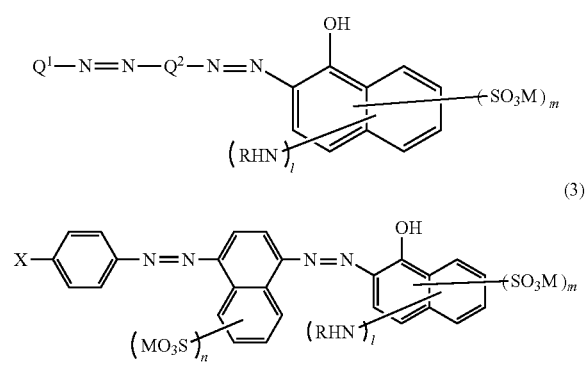

In the general formula (2), $Q^1$ and $Q^2$ are the same as the general formula (1). In the general formulas (2) and (3), R represents a hydrogen atom, a substituted or unsubstituted alkyl group having 1 to 3 carbon atoms, a substituted or unsubstituted acetyl group, a substituted or unsubstituted benzoyl group, or a substituted or unsubstituted phenyl group, l represents an integer of 0 to 2 indicating a number of substitution for —NHR group, M represents a counter ion, and m represents an integer of 0 to 6 indicating a number of substitution for —$SO_3M$ group. It is, however, $0 \leq l+m \leq 6$. In the general formula (3), n represents an integer of 0 to 4 indicating a number of substitution for —$SO_3M$ group, X represents a hydrogen atom, a halogen atom, a nitro group, a cyano group, —OH group, an alkoxy group having 1 to 4 carbon atoms, —$SO_3M$ group, —COOM group, —NHR group, or —CONHR group. M and R represents the same in the above mentioned X.

Here, at least one of m and n is an integer of 1 or more. When l, m, and n is 2 or more, respective substitutions may be the same or different.

As examples of the above-mentioned M (a counter ion), a hydrogen ion; an alkali metal ion such as Li, Na, K and Cs; an alkaline earth metal ion such as Ca, Sr and Ba; other metal ions; an ammonium ion which may be substituted with an alkyl group or a hydroxyalkyl group; and a cation derived from an organic amine can be cited. As examples of the organic amine, a lower alkylamine having 1 to 6 carbon atoms, a lower alkylamine having 1 to 6 carbon atoms and a hydroxyl group, and a lower alkylamine having 1 to 6 carbon atoms and a carboxyl group can be cited. When M is a divalent or higher-valent cation in each general formula, M is stabilized by being electrostatically bound with other anions or M is stabilized by being shared with other disazo compounds.

The disazo compounds represented by the general formulas (1) to (3) can be synthesized in accordance with "Riron Seizoh, Senryo Kagaku (Theory Production, Dye Chemistry), $5^{th}$ Edition" written by Yutaka Hosoda (published by Gihodo Shuppan Co., Ltd. on Jul. 15, 1968, pages 135 to 152).

For example, a monoazo aniline compound is obtained by converting an aniline compound having a substituent into a diazonium salt, and subjecting the salt to a coupling reaction with an aminonaphthalenesulfonic acid compound. After the monoazo aniline compound is converted into a diazonium salt, the disazo compound can be obtained by carrying out a coupling reaction with an anilino-hydroxynaphthalenedisulfonic acid under weakly alkaline.

The content of a dichroic liquid crystal compound in the patterning polarizing layer is not particularly limited. For example, the content of a dichroic liquid crystal compound in the patterning polarizing layer is 50% by mass to 100% by mass, and preferably 80% by mass to 100% by mass.

The patterning polarizing layer may contain other ingredients besides the dichroic liquid crystal compound. Examples of the other ingredients include such as a crystal liquid compound not having a dichroic property, a polymer and an additive. Examples of the additive include such as a compatibility accelerator, a surfactant, a thermal stabilizer, a light stabilizer, a lubricant, an antioxidant, a flame retardant, and an antistatic additive.

The content of the other ingredients is not particularly limited, and for example, it is more than 0% by mass and 50% by mass or less, and preferably more than 0% by mass and 20% by mass or less.

(Method for Producing Patterning Polarizing Plate)

One example of the method for producing a patterning polarizing plate of the present invention will be described. The method for producing a patterning polarizing plate in this example includes a step of applying onto a substrate a coating solution containing the above-described dichroic liquid crystal compound and a solvent. Here, "applying" means that a coating solution is deposited on the surface of a substrate to form a coating film.

The method for producing a patterning polarizing plate of the present invention may include steps other than the above-mentioned coating step. For example, the production method may include a step of drying the coating film obtained in the above-mentioned coating step. The substrate is preferably a substrate given an alignment regulating force as described above.

(1) Preparation of Coating Solution

The coating solution contains a dichroic liquid crystal compound and a solvent for dissolving or dispersing the dichroic liquid crystal compound. As the dichroic liquid crystal compound to be used, one selected from the compounds described above may be used alone, or two or more thereof may be used in combination.

The coating solution is obtained by dissolving or dispersing the dichroic liquid crystal compound in a solvent such as an aqueous solvent. Besides the dichroic liquid crystal compound, the above-described other components may be added to the solvent as required.

The solvent is not particularly limited and a conventionally known solvent may be used, however, an aqueous solvent is preferable. As an example of an aqueous solvent, water, a hydrophilic solvent, and a mixed solvent of water and a hydrophilic solvent can be cited. The hydrophilic solvent is a solvent which can be dissolved in water almost uniformly. As an example of a hydrophilic solvent, alcohols such as methyl alcohol, ethyl alcohol and isopropyl alcohol; glycols such as ethylene glycol and diethylene glycol; cellosolves such as methyl cellosolve and ethyl cellosolve; esters such as ethyl acetate; and the like can be cited. As the aqueous solvent, water or a mixed solvent of water and the hydrophilic solvent is used preferably.

The coating solution shows a liquid crystal phase by changing the solution temperature and the concentration of the dichroic liquid crystal compound.

The concentration of the dichroic liquid crystal compound in the coating solution is not particularly limited, but it is preferably a concentration at which the dichroic liquid crystal compound is not precipitated. The concentration may be a concentration at which the dichroic liquid crystal compound shows a liquid crystal phase in the aforementioned coating solution, or a concentration at which the dichroic liquid crystal compound does not show a liquid crystal phase in the solution. The concentration of the dichroic liquid crystal compound in the coating solution is preferably 0.05% by mass to 50% by mass, more preferably 0.5% by mass to 40% by mass, and particularly preferably 2% by mass to 30% by mass.

The pH of the coating solution is appropriately prepared. The pH of the coating solution is preferably about pH 2 to 10, and more preferably pH 6 to 8.

In addition, the temperature of the coating solution is prepared preferably 10° C. to 40° C., and more preferably 15° C. to 30° C.

The viscosity of the coating solution is appropriately prepared. The viscosity (23° C.) of the coating solution is preferably 1 mPa·s to 500 mPa·s.

(2) Application of Coating Solution

The coating solution is applied onto an alignment-treated substrate, such as an alignment layer, to form a coating film.

The coating solution can be applied using various kinds of coaters. Such coaters are not particularly limited, and examples thereof include bar coaters, gravure roll coaters, reverse roll coaters, kiss-roll coaters, dip roll coaters, knife coaters, and spray coaters.

The substrate, to which the coating solution is applied, is preferably one subjected to an alignment treatment such as an alignment layer. An alignment direction of the alignment layer, regions thereof, arrangement of regions thereof, and the like may be appropriately set in consideration of a patterning polarizing layer to be formed. Examples of the substrate subjected to an alignment treatment include a first alignment layer and a second alignment layer in the form of strips extending in the longitudinal direction of the substrate which were alternately arranged in the width direction.

The plane shape of the substrate may be a sheet shape or a long shape. The patterning polarizing plate can also be continuously produced in a roll-to-roll method by using a long-shape substrate.

The coating solution is applied all over the surface of the alignment layer, whereby a uniform coating film can be formed.

As a result of the application of the coating solution to the surface of the alignment layer, according to the direction of the alignment regulating force of the alignment layer, the dichroic liquid crystal compound in the coating film is aligned.

Incidentally, in order to enhance the alignment of the dichroic liquid crystal compound, after the formation of the coating film, a magnetic field, an electric field, or the like may be applied as necessary.

(3) Drying of Coating Film

By drying the coating film after application (uncured coating film), the aligned dichroic liquid crystal compounds are fixed. In the manner described above, the patterning polarizing plate of the present invention in which a patterning polarizing layer is formed on a substrate can be obtained. The cured coating film is the patterning polarizing layer.

Drying of the uncured coating film can be performed by natural drying or forced drying or the like. Examples of forced drying include drying under reduced pressure, heating drying and heating drying under reduced pressure.

The surface of the cured coating film may be subjected to a known water resistant treatment.

(Retardation Plate)

The occurrence of color irregularities in a plane of the light control device on the viewing side can be effectively suppressed by disposing the retardation plate. Arrangement of the retardation plate can be appropriately changed depending on whether the light control device is viewed from the first patterning polarizing plate side or viewed from the second patterning polarizing plate side. That is, the arrangement of the retardation plate can be appropriately changed according to a position of a light source which emits light serving as an objective of light transmitting and light blocking. For example, when the light control device is viewed from the second patterning polarizing plate side, the retardation plate is preferably disposed on a first outside (first patterning polarizing plate side) of the light control device. Further, when the light control device is viewed from the first patterning polarizing plate side, the retardation plate is preferably disposed on a second outside (second patterning polarizing plate side) of the light control device.

Moreover, when the light control device is viewed from both of the first and the second patterning polarizing plate sides (there are light sources on both sides of the light control device), the retardation plate may also be disposed on both of the first outside and the second outside. In this case, at least two retardation plates are used.

The reason why the occurrence of color irregularities can be suppressed by disposing the retardation plate is not clear, but the present inventors guess as follows.

That is, the light which enters the light control device (natural light, etc.) has a polarization component in which an electric field of light oscillates in a normal direction of an incident plane of light entering the polarizing plate (s-wave component); and a polarization component in which an electric field of light oscillates in a direction orthogonal to the direction of electric field oscillation of the s-wave component (p-wave component).

When the s-wave component is a component which transmits through the first polarization region of the patterning polarizing plate, the s-wave component does not transmit through the second polarization region (the second polarization region has an absorption axis in a direction orthogonal to the absorption axis of the first polarization region). In this case, the p-wave component transmits through the second polarization region of the patterning polarizing plate, but does not transmit through the first polarization region.

Here, if the s-wave component and the p-wave component of the incident light are equal in an amount to each other, and equal in an optical property (excluding an oscillation direction) to each other, the transmittance of the first polarization region is equal to the transmittance of the second polarization region, and therefore it is said that the difference in transmittance between both polarization regions is not produced and the color irregularities are not occurred.

However, light has a nature that the s-wave component is more than the p-wave component due to reflection. Therefore, if comparing the amount of the s-wave component of light to enter the light control device (e.g., natural light) with the amount of the p-wave component, the amount of the s-wave component is larger than that of the p-wave component. Further, there is an optical characteristic that when light enters the polarizing plate at a shallow angle, the s-wave component is harder to transmit through the polarizing plate (that is, easily reflected) than the p-wave component.

Therefore, the difference in transmittance between the first polarization region and the second polarization region is produced from the difference in the amount and the optical property between the s-wave component and the p-wave component, and consequently the color irregularities are thought to be occurred. Particularly, the difference in the amount between the s-wave component and the p-wave component is supposed to have a large effect on the occurrence of color irregularities.

Then, it is thought that by disturbing a polarization state of the incident light to the light control device using a retardation plate before the incident light enters the patterning polarizing plate, an amount of the s-wave component and an amount of the p-wave component which enter the patterning polarizing plate becomes approximately the same. Accordingly, the difference in transmittance between the first and the second polarization regions of the patterning polarizing plate becomes small, and consequently the occurrence of color irregularities is thought to be able to be suppressed.

The retardation plate may be bonded to the patterning polarizing plate or may not be bonded to the patterning polarizing plate. In the case of the former, the retardation plate may be bonded directly to the surface of the patterning polarizing plate with use of an adhesive or a pressure-sensitive adhesive, or may be bonded indirectly to the surface of the patterning polarizing plate with another layer other than the retardation plate interposed therebetween.

The retardation plate is preferably bonded directly to the patterning polarizing plate. In the example illustrated in FIG. 1, the retardation plate 3 is bonded directly to the second patterning polarizing plate 22.

The retardation plate of the present invention is not particularly limited as long as it can convert the linearly polarized light to circularly polarized light or elliptically polarized light, and for example, a quarter-wave plate (also referred to as a λ/4 plate), a three quarter-wave plate, and an ultra-high retardation plate in which an in-plane retardation value is 4000 nm or more can be used.

Examples of the retardation plate include a birefringent film formed by subjecting a polymer material to uniaxial stretching or biaxial stretching; an alignment film formed by aligning a liquid crystal monomer, and crosslinking/polymerizing the aligned monomer; an alignment film of liquid crystal polymer; and a laminated body in which a film supports an alignment layer of liquid crystal polymer. Stretching can be performed, for example, by a roll drawing method, a long-gap stretching method, a tenter stretching method or a tubular stretching method. A stretching magnification is commonly about 1.1 times to 6 times in the case of uniaxial stretching. A thickness of the retardation plate is not particularly limited, but it is commonly 10 to 200 μm, and preferably 20 to 100 μm.

Examples of the polymer material include polyvinyl alcohol, polyvinyl butyral, poly(methyl vinyl ether), polyhydroxyethyl acrylate, hydroxyethyl cellulose, hydroxypropyl cellulose, methyl cellulose, polycarbonate, polyarylate, polysulfone, polyethylene terephthalate, polyethylene naphthalate, polyethersulfone, polyphenylenesulfide, polyphenyleneoxide, polyarylsulfone, polyamide, polyimide, polyolefin, polycycloolefin, polyvinyl chloride, cellulose-based polymers, and various binary and ternary copolymers thereof, graft copolymers thereof and blended products thereof. These polymer materials become alignment products (stretched film) by stretching or the like.

As the liquid crystal monomer, any of lyotropic liquid crystal monomers and thermotropic liquid crystal monomers can be used; however, thermotropic liquid crystal monomers are suitable from the viewpoint of formability, and examples thereof include liquid crystal monomers containing, as a basic skeleton, biphenyl derivatives, phenyl benzoate derivatives or stilbene derivatives which have a functional group, such as an acryloyl group, a vinyl group and an epoxy group. Such a liquid crystal monomer can be aligned by appropriately using a known method, for example, a method by heat or light, a method of rubbing a substrate, a method of adding an alignment adjuvant. Thereafter, the liquid crystal monomer is crosslinked and polymerized by light, heat or electron beams with alignment of the liquid crystal monomer maintained, and thereby, the alignment can be fixed.

As the liquid crystal polymer, a main chain type polymer in which a conjugative linear atomic group (mesogens) providing liquid crystal alignment properties is introduced into a main chain or a side chain of the polymer, can be exemplified. Specific examples of the main chain type liquid crystalline polymer include polymers having a structure in which a mesogenic group is coupled with a spacer portion providing flexibility such as polyester-based liquid crystalline polymer having nematic alignment properties, discotic polymer and cholesteric polymer.

An in-plane retardation value (Re [590]) of a retardation plate is not limited, but it is preferably 100 nm or more. when the retardation plate is a quarter-wave plate, the in-plane retardation value (Re [590]) thereof is, for example, 100 nm or more, preferably 100 to 200 nm, more preferably 120 to 160 nm. When the retardation plate is a three-quarter wave plate, the in-plane retardation value (Re [590]) thereof is, for example, 100 nm or more, preferably 370 to 470 nm, more preferably 400 to 440 nm. When the retardation plate is an ultra-high retardation plate, the in-plane retardation value (Re [590]) thereof is, for example, 4000 nm or more, preferably 6000 to 15000 nm.

In addition, the in-plane retardation value (Re[590]) refers to an in-plane retardation value at 23° C. and at a wavelength of 590 nm. Re[590] can be determined by Re[590]=(nx−ny)×d when a thickness of a measurement objective is denoted by d (nm). Herein, "nx" represents a refractive index in a direction in which the refractive index is maximized in a plane of the measurement objective (here, a retardation plate) (usually referred to as an X-axis direction), and ny represents a refractive index in a direction orthogonal to the X-axis direction in a plane (usually, referred to as a Y-axis direction).

Preferably, as the retardation plate, a quarter-wave plate or a three quarter-wave plate in which the in-plane retardation value (Re[590]) is 100 nm or more, or a retardation plate in which the in-plane retardation value (Re[590]) is 4000 nm or more is used.

By using these retardation plates, a difference in transmittance between a plurality of polarization regions of the patterning polarizing plate can be more reduced, and the occurrence of color irregularities can be more effectively prevented.

Further, a slow axis direction of the retardation plate is preferably non-parallel to all absorption axis directions of a plurality of polarization regions contained in the first and second patterning polarizing plates.

Figure 5:
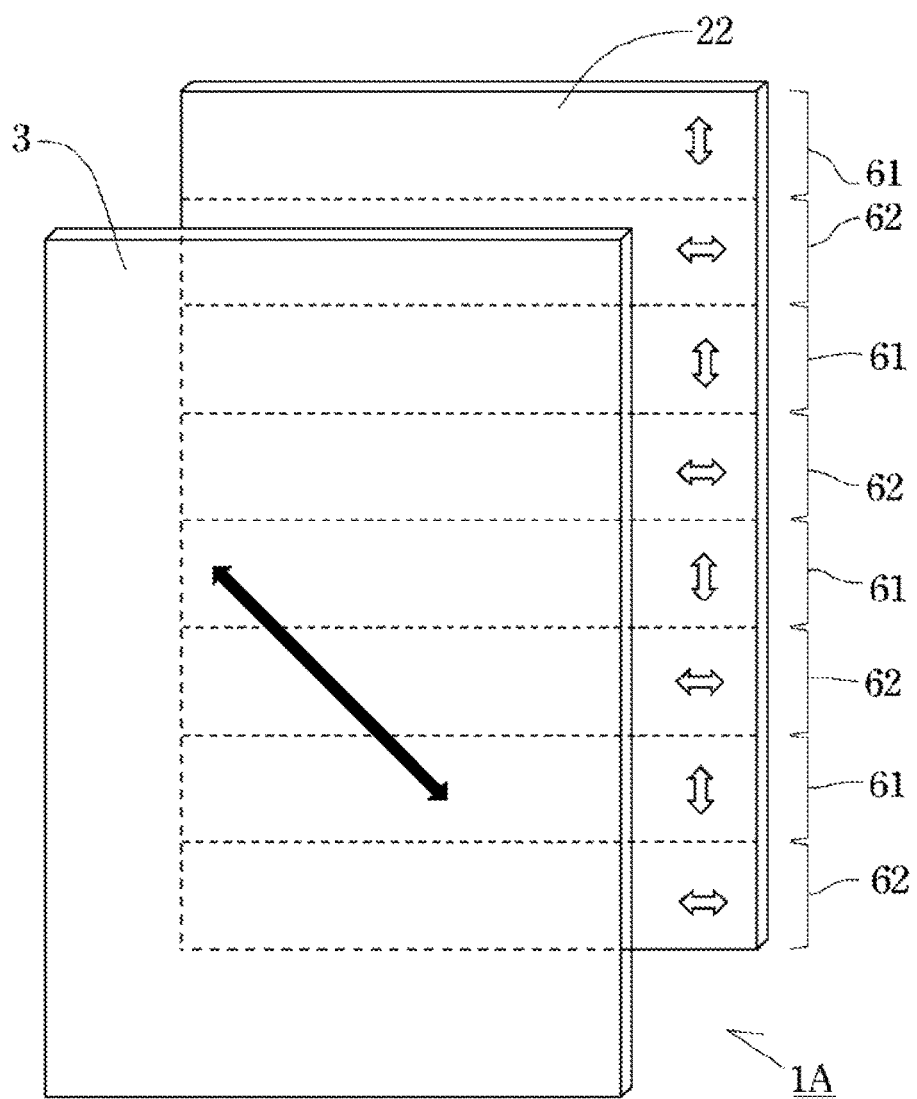
FIG. 5 is a perspective view schematically illustrating a light control device according to an embodiment for showing a relationship between a slow axis and an absorption axis (a first patterning polarizing plate is omitted).

FIG. 5 is a perspective view schematically illustrating a light control device 1A according to an embodiment of the present invention, but the first patterning polarizing plate 21 is omitted for convenience. Further, a bold black arrow in FIG. 5 indicates a direction of the slow axis of the retardation plate 3.

In the present embodiment, the second patterning polarizing plate 22 contains a first polarization region 61 and a second polarization region 62 which are alternately formed over a longitudinal direction of the polarizing plate. The absorption axis direction of the first polarization region 61 is parallel to a longitudinal direction of the second patterning polarizing plate 22, and the absorption axis direction of the second polarization region 62 is parallel to a short direction of the second patterning polarizing plate 22 (that is, orthogonal to the absorption axis of the first polarization region 61). Then, the retardation plate 3 arranged on the side opposite to the viewing side of the second patterning polarizing plate 22 is arranged such that its slow axis direction, and an absorption axis direction of the first polarization region 61 and an absorption axis direction of the second polarization region 62 cross each other at 45° angles.

As described above, when the slow axis direction of the retardation plate 3 is non-parallel to all absorption axis directions of the patterning polarizing plate 21 (22), the occurrence of color irregularities can be effectively suppressed.

In addition, the angle between the slow axis direction of the retardation plate 3 and the absorption axis directions of the patterning polarizing plate 21 (22), is not particularly limited, but it is preferably in the range of 10° to 80°, more preferably in the range of 20° to 70°, and particularly preferably in the range of 40° to 50°.

In FIG. 5, the angle between the slow axis direction and the absorption axis direction of the first polarization region 61 is equal to the angle between the slow axis direction and the absorption axis direction of the second polarization region 62 (respectively 45°). However, both angles may not necessarily be the same, may be different from each other, and may be in the above-mentioned range.

[Light Control Method of Light Control Device]

Figure 6:
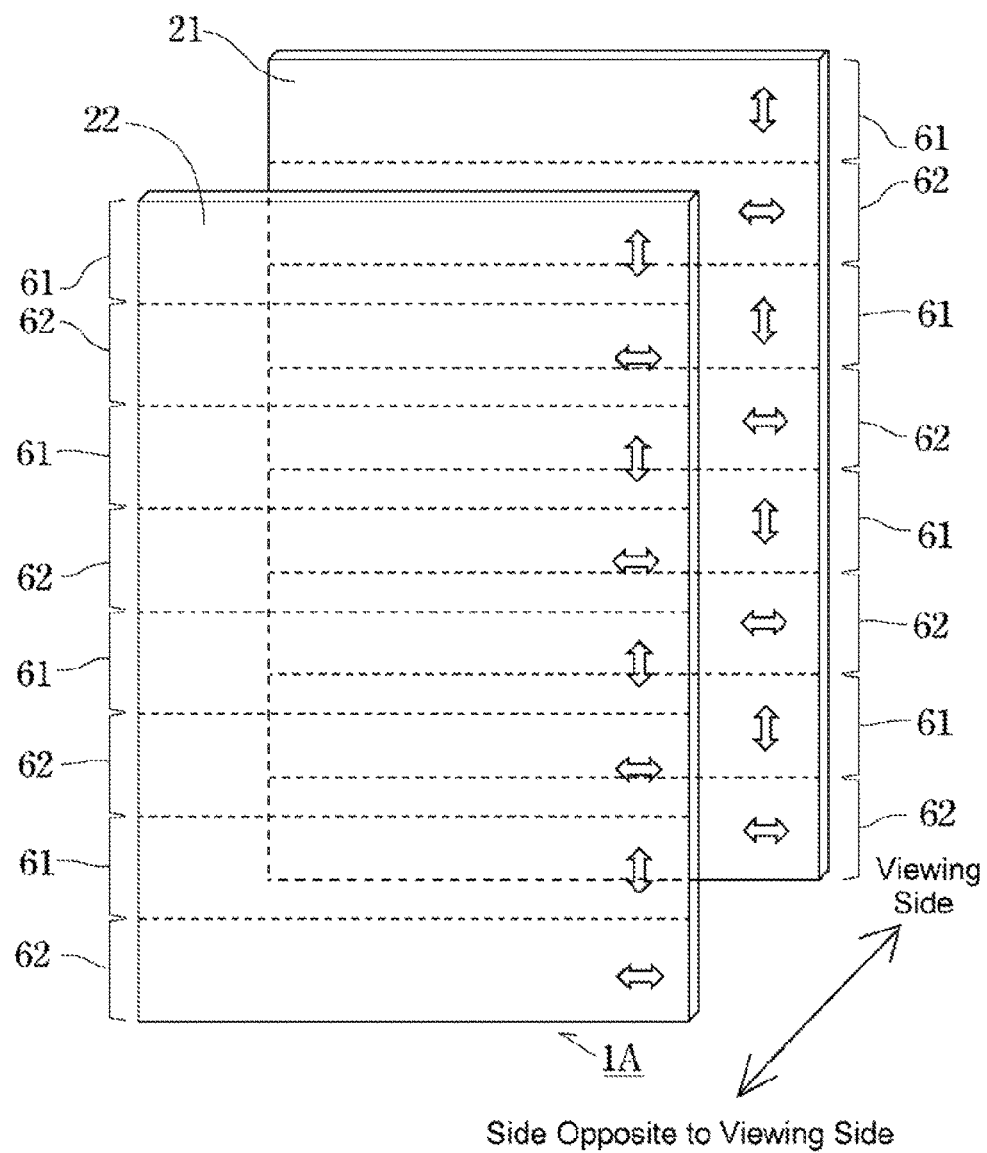
FIG. 6 is a perspective view schematically illustrating a light control device according to an embodiment for explaining a method of switching between a light-transmitting state and a light blocking state (a retardation plate is omitted).

A method for light control of a light control device of the present invention will be described in reference to FIG. 6. FIG. 6 is a perspective view schematically illustrating the light control device 1A according to an embodiment of the present invention; however, the retardation plate 3 is omitted for convenience.

In the light control device 1A of the present invention, at least any one of the first patterning polarizing plate 21 and the second patterning polarizing plate 22 is slidable in a plane direction. In the example illustrated in FIG. 6, the first patterning polarizing plate 21 and the second patterning polarizing plate 22 respectively contain a first polarization region 61 having an absorption axis parallel to its longitudinal direction, and a second polarization region 62 having an absorption axis in a direction orthogonal to the absorption axis of the first polarization region 61. In FIG. 6, the first polarization region 61 and the second polarization region 62 are alternately arranged in a longitudinal direction of the patterning polarizing plate 21 (22) and disposed in the form of a belt extending in a short direction.

When any one or both of two patterning polarizing plates 21 (22) are slid in one direction of a longitudinal direction, the first polarization region 61 of the first patterning polarizing plate 21 overlaps the first polarization region 61 of the second patterning polarizing plate 22, and the second polarization region 62 of the first patterning polarizing plate 21 overlaps the second polarization region 62 of the second patterning polarizing plate 22. That is, polarization regions having the same absorption axis directions overlap each other by sliding of the patterning polarizing plates 21 (22). In this case, linearly polarized light transmitting through the second patterning polarizing plate 22 transmits to the viewing side of the first patterning polarizing plate 21 without being absorbed by the first patterning polarizing plate 21. That is, the light control device 1A becomes a light-transmitting state.

On the other hand, when any one or both of two patterning polarizing plates 21 (22) are slid in a direction opposite to the above-mentioned one direction of a longitudinal direction, the first polarization region 61 of the first patterning polarizing plate 21 overlaps the second polarization region 62 of the second patterning polarizing plate 22, and the second polarization region 62 of the first patterning polarizing plate 21 overlaps the first polarization region 61 of the second patterning polarizing plate 22. That is, polarization regions having absorption axis directions orthogonal to each other overlap each other by sliding of the patterning polarizing plates 21 (22). In this case, linearly polarized light transmitting through the second patterning polarizing plate 22 is absorbed by the first patterning polarizing plate 21 and does not transmit to the viewing side of the first patterning polarizing plate 21. That is, the light control device 1A becomes a light blocking state.

In addition, in FIG. 6, since the first and the second polarization regions 61 and 62 are alternately arranged over a longitudinal direction of the patterning polarizing plate 21 (22), the patterning polarizing plate 21 (22) needs to be slid in its longitudinal direction in order to switch between a light-transmitting state and a light blocking state of the light control device 1A. However, the present invention is not limited to this embodiment, and a direction of sliding may be appropriately changed according to an arranged pattern of the polarization region.

For example, in the case of the light control device in which two patterning polarizing plates 21 (22) as illustrated in FIG. 4 are used, it is possible to switch between a light-transmitting state and a light blocking state by sliding the patterning polarizing plate 21 (22) in its short direction.

[Applications of Light Control Device of Present Invention]

The applications of the light control device of the present invention are not particularly limited. The light control device of the present invention can be used by itself and, it can also be applied to an existing member which requires light control. The light control device is preferably used as a member of a light control window. The light control window has a light control device, and a light-transmitting plate serving as an objective of light control. That is, by applying the light control device of the present invention to the light-transmitting plate, the light control window can be formed in which a light control function is imparted to the light-transmitting plate.

Figure 7:
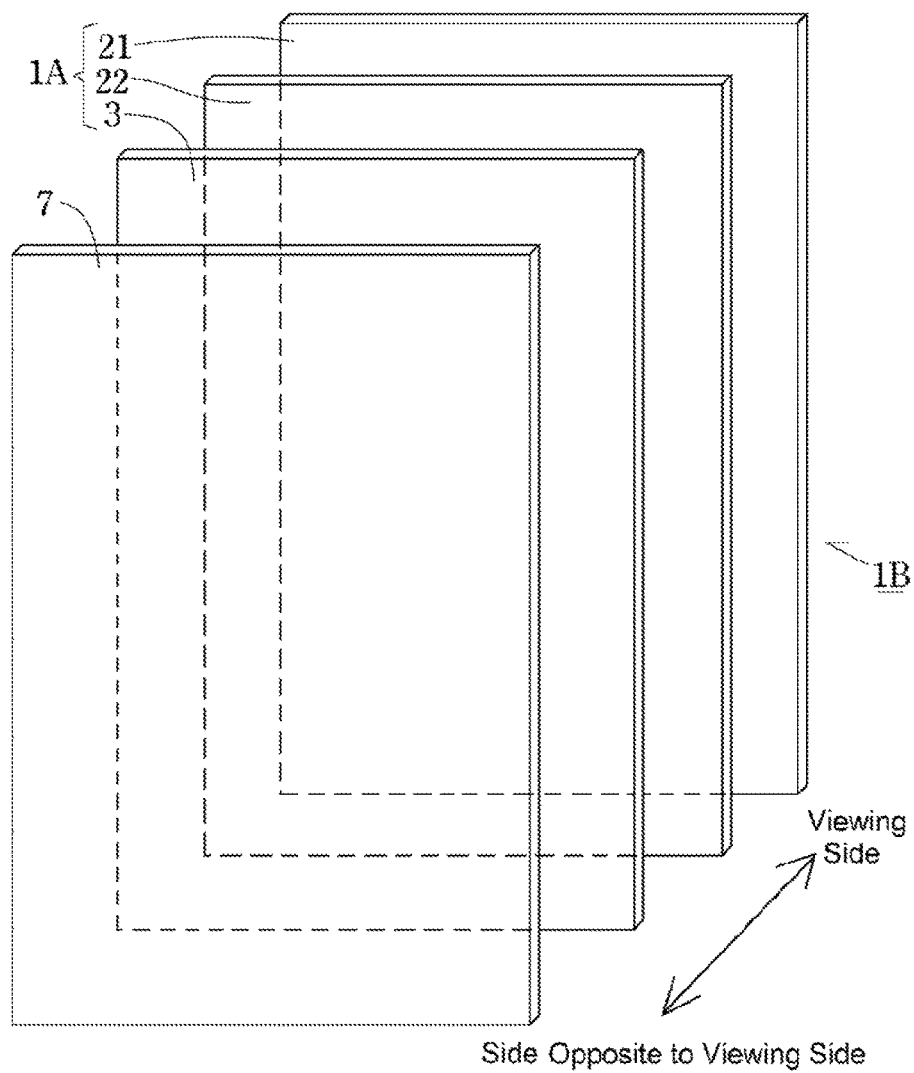
FIG. 7 is a perspective view schematically illustrating a light control window according to one embodiment.

FIG. 7 is a perspective view schematically illustrating an embodiment of a light control window 1B of the present invention. In FIG. 7, a light-transmitting plate 7 is arranged on a second outside (side opposite to the viewing side) of the light control device 1A. As described above, the light control device 1A can adjust a transmission quantity of light. Accordingly, a quantity of light is adjusted by the light control device 1A while light from the side opposite to the viewing side of the light control window 1B entering the light-transmitting plate 7 transmits to the opposite side (viewing side).

In addition, a position of the light-transmitting plate 7 which the light control device 1A is attached to is not limited to the embodiment illustrated in FIG. 7. For example, the light-transmitting plate 7 may be arranged on the first outside (viewing side) of the light control device 1A, or the light-transmitting plate 7 may be arranged on the inside of the light control device 1A. That the light-transmitting plate 7 is arranged on the inside of the light control device 1A is, for example, the case in which the light-transmitting plate 7 is arranged between the retardation plate 3 and the second patterning polarizing plate 22, or the case in which the light-transmitting plate 7 is arranged between the second patterning polarizing plate 22 and the first patterning polarizing plate 21.

Though, when the light-transmitting plate 7 has an optically anisotropic property, it is preferred to avoid arranging the light-transmitting plate 7 between the first patterning polarizing plate 21 and the second patterning polarizing plate 22. A directional property of linearly polarized light transmitting through the second patterning polarizing plate 22 is disturbed by the light-transmitting plate 7 having an optically anisotropic property, and therefore it may become hard to switch between the light-transmitting state and the light blocking state of the light control window 1B by the light control device 1A.

When the light control window 1B is disposed between the outdoor and the indoor, the light control device 1A can be prevented from being deteriorated due to weather by arranging the light control device 1A on the viewing side of the light-transmitting plate 7. On the other hand, when durability of the light-transmitting plate is low, the light-transmitting plate can be protected from weather by arranging the light-transmitting plate on the viewing side of the light control device 1A. In the latter case, it is preferred to dispose a protection layer for protecting the retardation plate 3 on the side opposite to the viewing side of the retardation plate 3.

Naturally, also when the light-transmitting plate 7 is disposed on the inside of the light control device LA, the light-transmitting plate 7 can be protected from weather.

Figure 8:
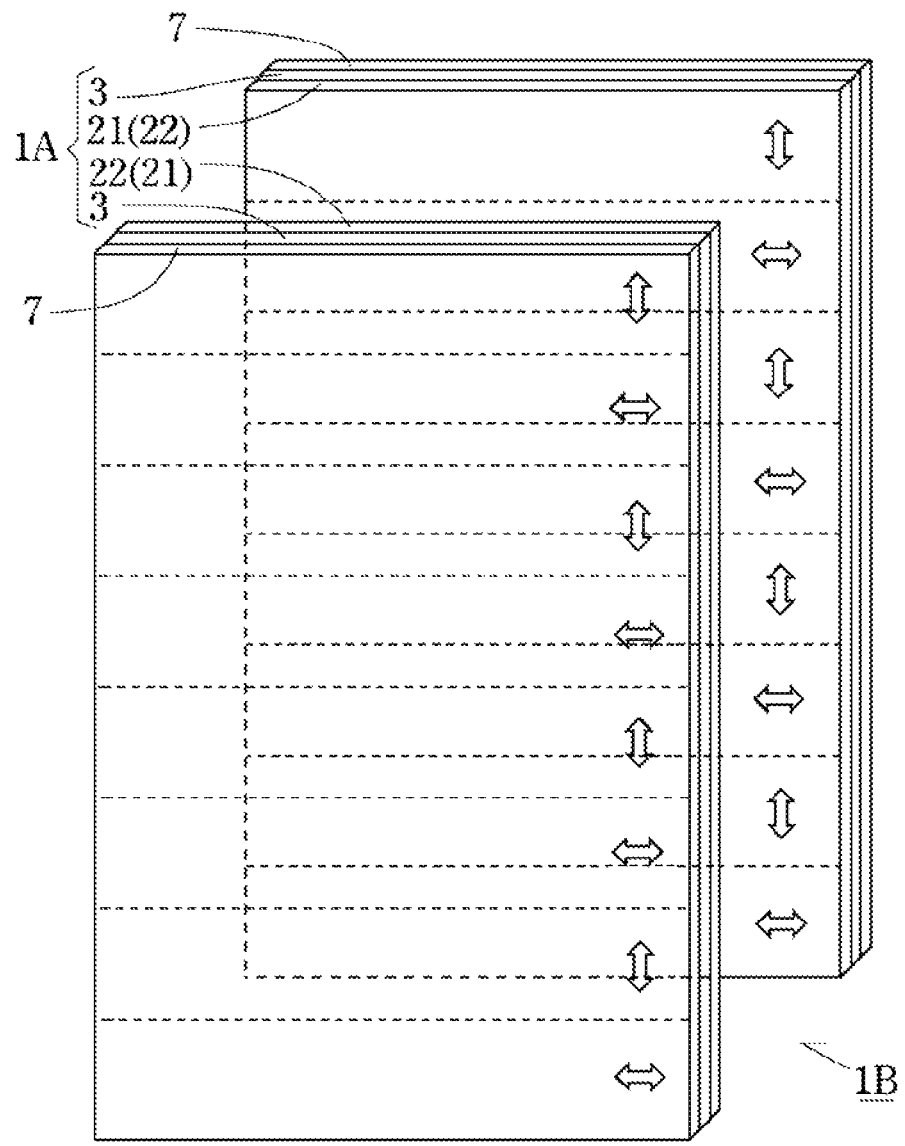
FIG. 8 is a perspective view schematically illustrating a light control window according to another embodiment.

Further, FIG. 8 is a perspective view schematically illustrating a light control window 1B according to another embodiment. The light control window 1B in this drawing has two light-transmitting plates 7 and 7. On the light-transmitting plate 7, the retardation plate 3 and the patterning polarizing plates 21 (22) are laminated to form an optical laminated body.

In the present light control window 1B, two optical laminated bodies are arranged such that patterning polarizing plates 21 (22) of the optical laminated bodies face each other. Further, when at least one of both optical laminated bodies is slid in a plane direction, light control becomes possible.

In the present embodiment, even when a light source emitting light serving as an objective of light transmitting and light blocking is present on both sides of the light control window, the occurrence of color irregularities can be effectively suppressed on both sides of the light control window.

The light-transmitting plate is a transparent member to which the light control device of the present invention is attached. Herein, the term "transparent" means to have a property of transmitting visible light. "Transparent" includes the case where visible light is not substantially absorbed and light of all wavelengths in a visible light region is transmitted, and the case where light of a part of wavelengths in a visible light region is absorbed and light of wavelengths other than the above-mentioned wavelengths is transmitted. The total light transmittance of the light-transmitting plate is preferably 70% or more. The total light transmittance is measured according to JIS K 7375.

The light-transmitting plate may have an optically anisotropic property; however, preferably, it does not have the optically anisotropic property (i.e., it has an optically isotropic property). As described above, when the light-transmitting plate has the optically anisotropic property, arrangement of the light-transmitting plate and the light control device has to be considered. On the other hand, the light-transmitting plate having the optically isotropic property does not impair a light control function of the light control device and can suitably suppress the occurrence of color irregularities even when the light-transmitting plate is arranged between the first patterning polarizing plate and the second patterning polarizing plate.

Herein, "the light-transmitting plate has an optically isotropic property" includes not only the case in which an ellipsoid of a refractive index of the light-transmitting plate is nx=nz=ny, but also the case where an ellipsoid of a refractive index is nx≈nz≈ny. Specifically, "the light-transmitting plate has an optically isotropic property" includes the case in which an absolute value of an in-plane birefringence Δnxy (Δnxy=nx−ny) of the light-transmitting plate, and an absolute value of a birefringence in a thickness direction Δnxz (Δnxz=nx−nz) are 0.0005 or less, preferably 0.0001 or less, and more preferably 0.00005 or less.

In addition, the definitions of "nx" and "ny" are the same as the description in the above-mentioned retardation plate. Further, "nz" represents a refractive index in a thickness direction (a direction orthogonal to an X-axis and a Y-axis of the measurement objective) at the time when a measurement objective (here, light-transmitting plate) is measured at 23° C. and at a wavelength of 590 nm.

The light-transmitting plate is not particularly limited as long as it is transparent, and a glass plate or a synthetic resin plate is used. While the glass plate has advantages that chemical stability is high, abrasion resistance of the surface is large and aged deterioration is low, it has disadvantages that its weight is large, impact resistance is low and there is a possibility of injury by glass fragments when it is broken. On the other hand, while the synthetic resin plate has advantages that its weight is small, impact resistance is high and a possibility of injury is low when it is broken compared with the glass plate, it has disadvantages that chemical stability is low, abrasion resistance of the surface is small and aged deterioration is high. As the light-transmitting plate, a proper material can be selected according to use in consideration of the above-mentioned characteristics of the glass plate and the synthetic resin plate. In addition, a laminated plate obtained by overlaying the glass plate and the synthetic resin plate on each other can also be used.

A thickness of the light-transmitting plate is not particularly limited, but it is preferably 1 mm to 30 mm, and more preferably 1 mm to 15 mm.

In view of a function of the light control device of the present invention, it is preferred that the light control device be applied to a window glass. In this case, a light control window having the window glass and the light control device can adjust, through the light control device, a quantity of light from the outdoor (side opposite to the viewing side) which enters the indoor (viewing side).

The light control window may be installed between two rooms in doors, or may be installed between indoor and outdoor. In the case of the former, almost of light entering the light control window is light emitted from a fluorescent lamp disposed in doors, and in the case of the latter, almost of light entering the light control window is natural light emitted from the sun. In both cases, when the light control window is installed such that a light source is located on the side opposite to the viewing side, color irregularities are hardly observed in a plane of the light control window in viewing the light control window from viewing side.

[Optical Laminated Body for Light Control Device]

Further, an optical laminated body for a light control device can be formed by laminating a retardation plate on the above-mentioned patterning polarizing plate. The occurrence of color irregularities can be effectively suppressed by using the optical laminated body on the viewing side of the light control device.

EXAMPLES

The present invention is further described using Examples and Comparative Examples as follows. However, the present invention is not limited to only these Examples below.

Example 1

(Preparation of Polarizing Film Piece)

Figure 9:
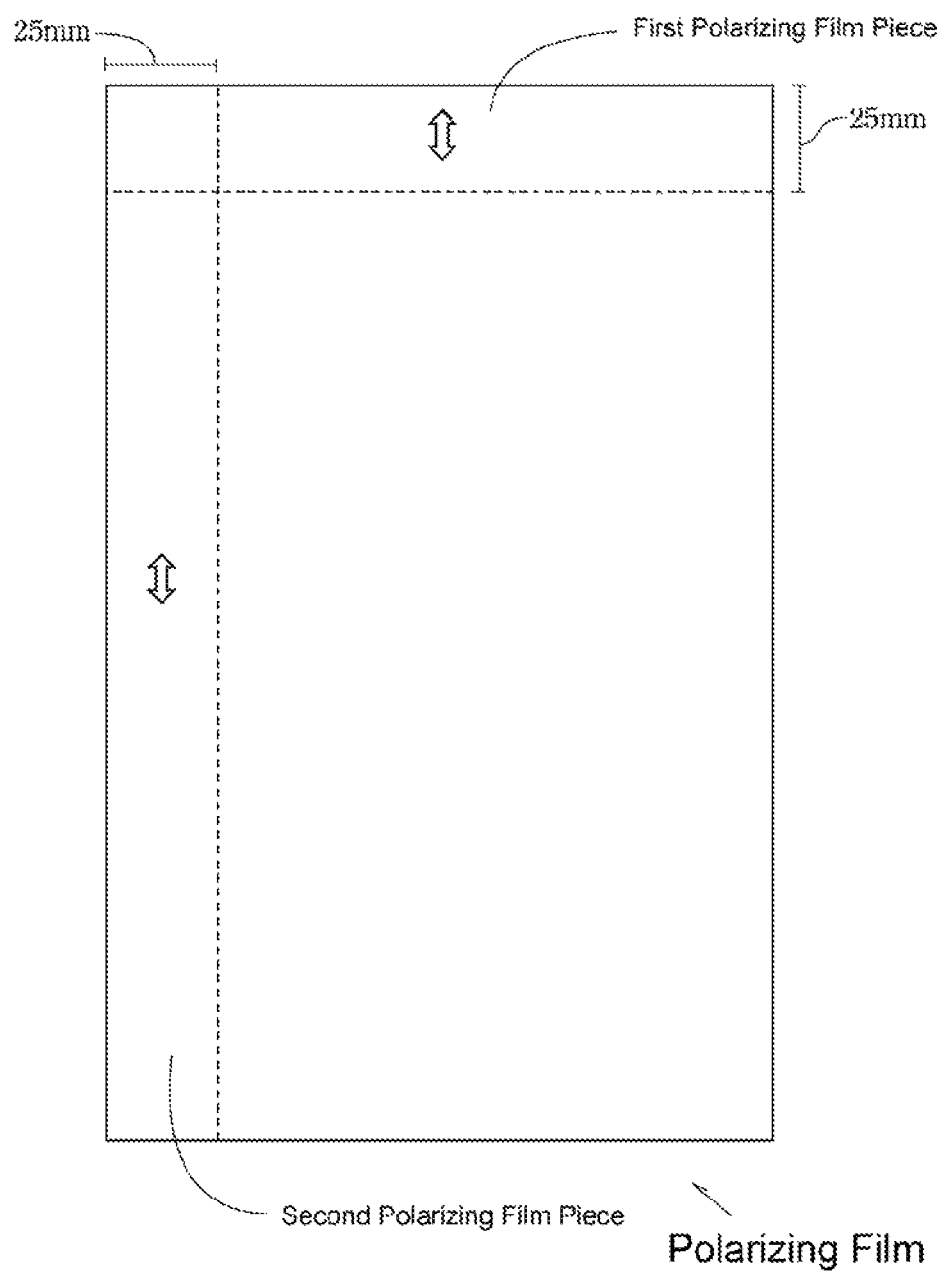
FIG. 9 is a reference view illustrating a preparation method of polarizing film pieces used in Examples and Comparative Example, and broken lines in the drawing represent a cutoff line.

At first, a rectangular polarizing film (manufactured by NITTO DENKO CORPORATION, trade name "SEG 1425DU") as illustrated in FIG. 9 was prepared. The polarizing film has an absorption axis in a direction parallel to a longitudinal direction of the film as illustrated in FIG. 9. The polarizing film was cut off in a direction parallel to a short direction of the film to obtain a plurality of first polarizing film pieces of 25 mm wide. In addition, in FIG. 9, a broken line represents a cutoff line of the polarizing film piece.

Then, the polarizing film was cut off in a direction parallel to a longitudinal direction of the film to obtain a plurality of second polarizing film pieces of 25 mm wide.

(Preparation of Patterning Polarizing Plate)

An amorphous polyethylene terephthalate (PET) film (manufactured by Mitsubishi Plastics, Inc., trade name "Nobakuria SG-007") having a thickness of 200 μm was stretched by 4.0 times with a tenter stretching machine at 87° C. to prepare a retardation plate. The thickness of the prepared retardation plate was 52 m and the in-plane retardation value (Re[590]) of the film was 4450 nm.

Then, a rectangular glass plate (manufactured by Matsunami Glass Ind., Ltd., trade name "8200423") having a size of 165 mm long×65 mm wide×1.3 mm thick was prepared, and the above retardation plate was bonded to the surface of the glass plate using a pressure-sensitive adhesive. The retardation plate was bonded such that its slow axis, and both of an absorption axis direction of the first polarization region and an absorption axis direction of the second polarization region respectively described later cross each other at 45° angles.

Next, to the surface of the retardation plate, a first polarizing film piece and a second polarizing film piece were bonded. The first polarizing film piece and the second polarizing film piece were bonded so as to be alternately arranged in a length direction (longitudinal direction) of the glass plate.

In this way, a patterning polarizing plate which contains a first polarization region (region with the first polarizing film piece bonded) having an absorption axis parallel to a longitudinal direction of the glass plate, and a second polarization region (region with the second polarizing film piece bonded) having an absorption axis parallel to a direction orthogonal to the longitudinal direction of the glass plate (short direction), was obtained. This patterning polarizing plate is as illustrated in FIG. 2.

(Preparation of Optical Laminated Body)

Next, two of the patterning polarizing plates obtained in the above step were prepared and overlaid on each other such that patterning polarizing plates (polarizing film pieces) face each other to obtain an optical laminated body. In addition, overlaying of the patterning polarizing plates was performed such that a first (second) polarization region of one patterning polarizing plate and a first (second) polarization region of the other patterning polarizing plate overlap as illustrated in FIG. 8.

Figure 10:
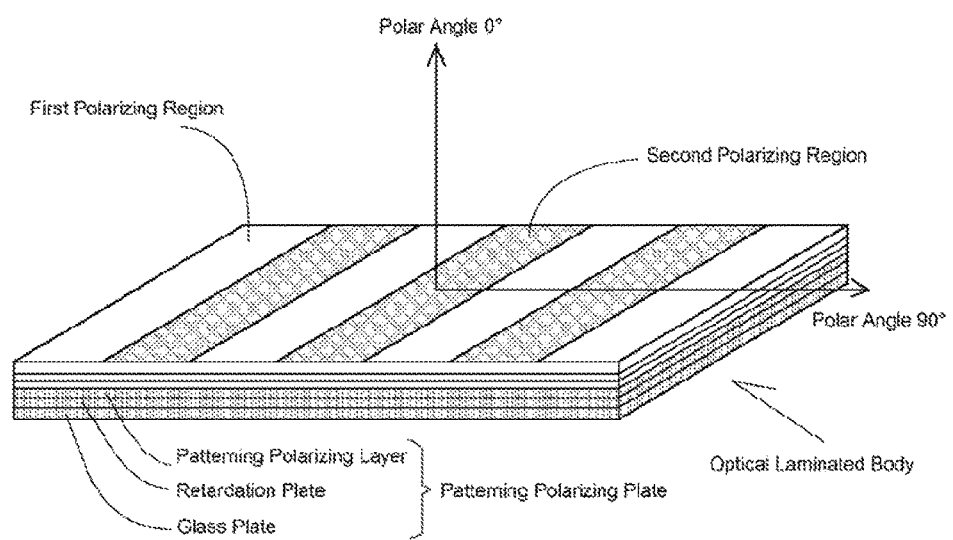
FIG. 10 is a reference view illustrating measurement angles (polar angles) of total light transmittances of optical laminated bodies of Examples and Comparative Example.

That is, by laminating two patterning polarizing plates to form an optical laminated body, a light control device which is in a light-transmitting state was produced (refer to FIG. 10).

(Measurement of Transmittance)

A transmittance at a wavelength of 550 nm of the first polarization region of the obtained optical laminated body and a transmittance at a wavelength of 550 nm of the second polarization region were measured by using a spectroscopic ellipsometer (manufactured by J. A. Woollam Co., Inc., trade name "M-2000VI"). In addition, the transmittance is measured with reference to a wavelength of 550 nm, and the transmittance was measured stepwise from a polar angle of 0° (a direction perpendicular to a polarization region (surface of the optical laminated body)) to a polar angle of 90° (a direction parallel to a polarization region (surface of the optical laminated body)) (refer to FIG. 10).

Moreover, transmittances of the first and the second polarization region from the polar angle of 0° to the polar angle of 80° were plotted on a graph. The result thereof is illustrated in FIG. 11(a). Further, the difference in transmittance (ΔT) between the first polarization region and the second polarization region at the polar angle of 60° was calculated. The result thereof is shown in Table 1.

(Evaluation of Color Irregularities)

One surface of the obtained optical laminated body was observed in an oblique direction (polar angle of 45°). As a result of this, a pattern (stripe-like pattern) which is thin enough to be practically ignored was observed.

Example 2

A cycloolefin based resin film (manufactured by Zeon Co., Ltd., trade name: "ZF14-100") having a thickness of 100 μm was stretched by 1.4 times with a tenter stretching machine at 145° C. to prepare a retardation plate (a quarter-wave plate). The thickness of the prepared retardation plate was 88 μm and the in-plane retardation value (Re[590]) of the film was 141 nm.

An optical laminated body was prepared in the same manner as in Example 1 except for using a quarter-wave plate thus obtained as a retardation plate, and the transmittance and the difference in transmittance of the optical laminated body were measured. The results thereof are shown in FIG. 11(b) and Table 1.

Further, the obtained optical laminated body was observed in the same manner as in Example 1, and consequently a pattern (stripe-like pattern) which is thin enough to be practically ignored was observed.

Comparative Example 1

An optical laminated body was prepared in the same manner as in Example 1 except for using a triacetyl cellulose film (manufactured by KONICA MINOLTA, INC., trade name "KC4UY") having a thickness of 40 μm and substantially having an optically isotropic property in place of the retardation plate, and the transmittance and the difference in transmittance of the optical laminated body were measured. The results thereof are shown in FIG. 11(c) and Table 1.

Further, the obtained optical laminated body was observed in the same manner as in Example 1, and consequently a clear pattern (stripe-like pattern) was observed.

TABLE 1

|  | Example 1 | Example 2 | Comparative Example 1 |
|---|---|---|---|
| Retardation Plate | Ultra-high Retardation Plate | Quarter-wave plate | None (TAC film was used instead) |
| In-plane Retardation Value of Retardation Plate (Re[590])(nm) | 4450 | 141 | 2 (Value of TAC film) |
| Difference in Transmittance at Polar Angle 60° | 4.1 | 3.4 | 8.6 |

[Evaluation]

Figure 11:
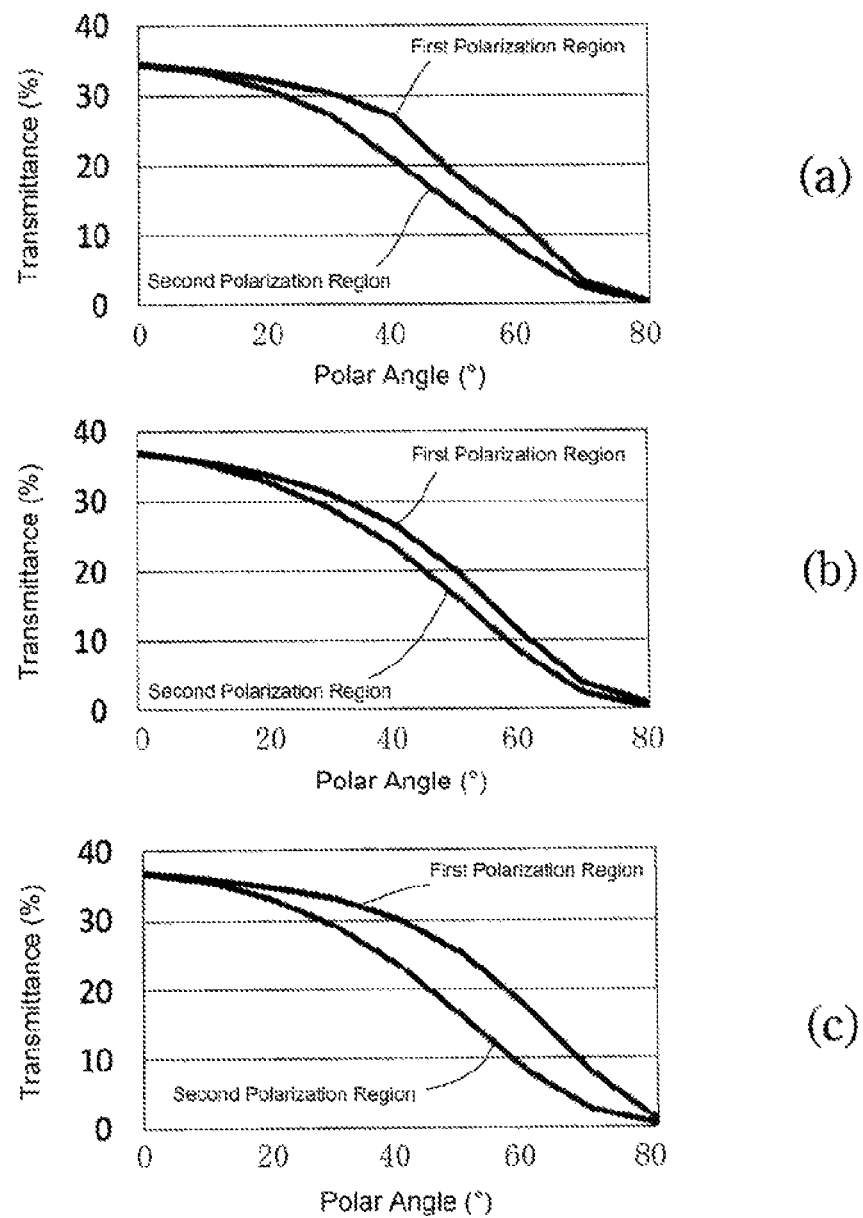
FIGS. 11(a) to 11(c) are graphs obtained by plotting a transmittance with respect to the polar angle (0° to 80°) of each of the optical laminated bodies of Examples and Comparative Example.

From FIG. 11, in the optical laminated bodies of Examples 1 and 2 respectively having a retardation plate, the difference (ΔT) between the transmittance of the first polarization region and the transmittance of the second polarization region in the polar angle range of 0° to 80° is relatively small. On the other hand, in Comparative Example 1, ΔT in the polar angle range of 0° to 80° is relatively large.

As described above, since in Examples 1 and 2, the ΔT is smaller than that of Comparative Example 1, it is found that color irregularities are hardly observed, and particularly color irregularities in observing the optical laminated body from an oblique direction are suppressed.

1A Light control device, 1B Light control window, 21 First patterning polarizing plate, 22 Second patterning polarizing plate, 3 Retardation plate, 4 Substrate, 5 Alignment layer, 51 First alignment layer, 52 Second alignment layer, 6 Patterning alignment layer, 61 First polarization region, 62 Second polarization region, 7 Light-transmitting plate

The invention claimed is:

1. A light control device comprising:
   a first patterning polarizing plate containing at least two polarization regions having different absorption axis directions;
   a second patterning polarizing plate containing the same polarization regions as those of the first patterning polarizing plate; and
   a retardation plate disposed outside the first patterning polarizing plate and the second patterning polarizing plate,
   wherein at least any one of the first and the second patterning polarizing plates is disposed slidably in a plane direction, and
   the retardation plate is a quarter-wave plate or a three quarter-wave plate in which an in-plane retardation value at 23° C. and at a wavelength of 590 nm is 100 nm or more, or an ultra-high retardation plate in which an in-plane retardation value at 23° C. and at a wavelength of 590 nm is 4000 nm or more, and
   an angle between a slow axis direction of the retardation plate and each of the absorption axis directions of the at least two polarization regions contained in the first patterning polarizing plate is in a range of 10° to 80°, and an angle between the slow axis direction of the retardation plate and each of the absorption axis directions of the at least two polarization regions contained in the second patterning polarizing plate is in a range of 10° to 80°.

2. The light control device according to claim 1, wherein each of the first patterning polarizing plate and the second patterning polarizing plate contains at least a first polarization region and a second polarization region, and an absorption axis direction of the first polarization region is orthogonal to an absorption axis direction of the second polarization region.

3. The light control device according to claim 1, wherein the retardation plate is disposed on the outside of the first and the second patterning polarizing plates.

4. A light control window comprising the light control device according to claim 1 and a light-transmitting plate serving as an objective of light control by the light control device.

5. The light control window according to claim 4, wherein the light-transmitting plate has an optically isotropic property.

6. The light control window according to claim 4, wherein the light-transmitting plate is a window glass.

7. The light control window according to claim 4, wherein the light-transmitting plate is disposed on the outside of the light control device.

8. An optical laminated body for a light control device comprising:
   a patterning polarizing plate containing at leas two polarization regions having different absorption axis directions; and
   a retardation plate,
   wherein the retardation plate is a quarter-wave plate or a three quarter-wave plate in which an in-plane retardation value at 23° C. and at a wavelength of 590 nm is 100 nm or more, or an ultra-high retardation plate in which an in-plane retardation value at 23° C. and at a wavelength of 590 nm is 4000 nm or more, and
   an angle between a slow axis direction of the retardation plate and each of the absorption axis directions of the at least two polarization regions contained in the patterning polarizing plate is in a range of 10° to 80°.

* * * * *